United States Patent
Cheng et al.

(10) Patent No.: US 11,100,604 B2
(45) Date of Patent: Aug. 24, 2021

(54) MULTIPLE APPLICATION COOPERATIVE FRAME-BASED GPU SCHEDULING

(71) Applicants: Advanced Micro Devices, Inc., Santa Clara, CA (US); ATI Technologies ULC, Markham (CA)

(72) Inventors: Jeffrey Gongxian Cheng, Toronto (CA); Ahmed M. Abdelkhalek, Ajax (CA); Yinan Jiang, Richmond Hill (CA); Xingsheng Wan, Richmond Hill (CA); Anthony Asaro, Toronto (CA); David Martinez Nieto, El Cerrito, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/263,709

(22) Filed: Jan. 31, 2019

(65) Prior Publication Data

US 2020/0250787 A1  Aug. 6, 2020

(51) Int. Cl.
*G06F 15/80* (2006.01)
*G06T 1/20* (2006.01)
(Continued)

(52) U.S. Cl.
CPC .............. *G06T 1/20* (2013.01); *G06F 9/3877* (2013.01); *G06F 9/4881* (2013.01); *G06T 15/005* (2013.01)

(58) Field of Classification Search
CPC ...... G06F 1/3212; G06F 1/3206; G06F 9/485; G06F 11/0715; G06F 11/3438;
(Continued)

(56) References Cited

U.S. PATENT DOCUMENTS

| 5,930,390 A | 7/1999 | Coelho |
| 6,524,198 B2 | 2/2003 | Takeda |

(Continued)

OTHER PUBLICATIONS

International Search Report and Written Opinion in International Application No. PCT/IB2018/057511, dated Jan. 22, 2019, 8 pages.

(Continued)

*Primary Examiner* — Hau H Nguyen
(74) *Attorney, Agent, or Firm* — Kowert Hood Munyon Rankin and Goetzel PC; Rory D. Rankin

(57) ABSTRACT

Systems, apparatuses, and methods for scheduling jobs for multiple frame-based applications are disclosed. A computing system executes a plurality of frame-based applications for generating pixels for display. The applications convey signals to a scheduler to notify the scheduler of various events within a given frame being rendered. The scheduler adjusts the priorities of applications based on the signals received from the applications. The scheduler attempts to adjust priorities of applications and schedule jobs from these applications so as to minimize the perceived latency of each application. When an application has enqueued the last job for the current frame, the scheduler raises the priority of the application to high. This results in the scheduler attempting to schedule all remaining jobs for the application back-to-back. Once all jobs of the application have been completed, the priority of the application is reduced, permitting jobs of other applications to be executed.

20 Claims, 9 Drawing Sheets

(51) Int. Cl.
*G06F 9/38* (2018.01)
*G06F 9/48* (2006.01)
*G06T 15/00* (2011.01)

(58) Field of Classification Search
CPC .............. G06F 1/329; G06F 2209/482; G06F 9/44505; G06F 9/46; G06F 9/54
See application file for complete search history.

(56) References Cited

U.S. PATENT DOCUMENTS

| | | | |
|---|---|---|---|
| 6,618,397 | B1 | 9/2003 | Huang |
| 6,680,976 | B1 | 1/2004 | Chen et al. |
| 6,683,988 | B1 | 1/2004 | Fukunaga et al. |
| 6,754,234 | B1 | 6/2004 | Wiesner et al. |
| 7,471,823 | B2 | 12/2008 | Ubillos et al. |
| 7,813,000 | B2 | 10/2010 | Ternasky et al. |
| 8,175,181 | B1 | 5/2012 | Nabar et al. |
| 9,270,969 | B2 | 2/2016 | Hong et al. |
| 9,407,923 | B2 | 8/2016 | Barak |
| 9,924,134 | B2 | 3/2018 | Glen |
| 2001/0033286 | A1 | 10/2001 | Stokes et al. |
| 2005/0223165 | A1 | 10/2005 | Schmidt et al. |
| 2006/0171596 | A1 | 8/2006 | Sung et al. |
| 2008/0049651 | A1 | 2/2008 | Chang et al. |
| 2008/0201716 | A1* | 8/2008 | Du .................. G06F 9/383 718/104 |
| 2009/0052537 | A1 | 2/2009 | Burazerovic et al. |
| 2009/0148058 | A1 | 6/2009 | Dane et al. |
| 2009/0213940 | A1 | 8/2009 | Steinbach et al. |
| 2010/0050225 | A1 | 2/2010 | Bennett |
| 2010/0157154 | A1 | 6/2010 | Kobayashi et al. |
| 2010/0177776 | A1 | 7/2010 | Crinon et al. |
| 2011/0050695 | A1 | 3/2011 | Sullivan et al. |
| 2011/0066262 | A1 | 3/2011 | Kelly et al. |
| 2011/0157196 | A1 | 6/2011 | Nave et al. |
| 2011/0263332 | A1 | 10/2011 | Mizrachi |
| 2011/0299606 | A1 | 12/2011 | Chen et al. |
| 2012/0008679 | A1 | 1/2012 | Bakke |
| 2012/0079329 | A1 | 3/2012 | Steinbach et al. |
| 2012/0236934 | A1 | 9/2012 | Chen et al. |
| 2012/0243009 | A1 | 9/2012 | Chapman et al. |
| 2013/0039594 | A1 | 2/2013 | Chen et al. |
| 2013/0053141 | A1 | 2/2013 | Guérin et al. |
| 2013/0058394 | A1 | 3/2013 | Nilsson et al. |
| 2013/0076771 | A1 | 3/2013 | Bachman et al. |
| 2013/0083161 | A1 | 4/2013 | Hsu et al. |
| 2013/0335432 | A1 | 12/2013 | Iwasaki |
| 2014/0028876 | A1 | 1/2014 | Mills |
| 2014/0194196 | A1 | 7/2014 | Hoy et al. |
| 2014/0211860 | A1 | 7/2014 | Zhao et al. |
| 2014/0267780 | A1 | 9/2014 | Spears et al. |
| 2014/0317068 | A1 | 10/2014 | Yang et al. |
| 2014/0372918 | A1* | 12/2014 | Wang .................. G06F 3/0481 715/765 |
| 2014/0376612 | A1 | 12/2014 | Chen et al. |
| 2016/0358305 | A1* | 12/2016 | Banerjee .................. G06T 1/20 |
| 2016/0381392 | A1 | 12/2016 | Wiegand et al. |
| 2017/0142447 | A1 | 5/2017 | Toth et al. |
| 2018/0091819 | A1 | 3/2018 | Cook et al. |
| 2019/0068983 | A1 | 2/2019 | Ryan et al. |
| 2019/0104311 | A1 | 4/2019 | Amer et al. |
| 2019/0158704 | A1 | 5/2019 | Sines et al. |
| 2019/0182308 | A1 | 6/2019 | Vu et al. |

OTHER PUBLICATIONS

Non-Final Office Action in U.S. Appl. No. 15/686,892, dated Mar. 7, 2019, 14 pages.
Non-Final Office Action in U.S. Appl. No. 15/834,400, dated Feb. 27, 2019, 16 pages.
Final Office Action in U.S. Appl. No. 15/834,400, dated Jul. 10, 2019, 15 pages.
Non-Final Office Action in U.S. Appl. No. 15/721,078, dated Jan. 31, 2019, 9 pages.
Non-Final Office Action in U.S. Appl. No. 15/816,765, dated Jun. 26, 2019, 11 pages.
Non-Final Office Action in U.S. Appl. No. 15/686,892, dated Jun. 1, 2020, 14 pages.

* cited by examiner

MULTIPLE APPLICATION COOPERATIVE FRAME-BASED GPU SCHEDULING

BACKGROUND

Description of the Related Art

A graphics processing unit (GPU) is a complex integrated circuit that performs graphics-processing tasks. For example, a GPU executes graphics-processing tasks required by an end-user application, such as a video-game application. GPUs are also increasingly being used to perform other tasks which are unrelated to graphics. In some implementations, the GPU is a discrete device or is included in the same device as another processor, such as a central processing unit (CPU). In many applications, such as graphics processing applications executed by a GPU, a sequence of work-items, which can also be referred to as threads, are processed so as to output a final result. In one implementation, each processing element executes a respective instantiation of a particular work-item to process incoming data. A work-item is one of a collection of parallel executions of a kernel invoked on a compute unit. A work-item is distinguished from other executions within the collection by a global ID and a local ID. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation.

In an environment where multiple frame-based real-time applications (e.g., games, rendering applications) are executing simultaneously on a single processing unit (e.g., GPU), existing scheduling schemes are not accurately aware of the status or urgency of each application's frame workload, and thus make sub-optimal scheduling decisions at runtime. This results in increased late frame completion for all applications, which negatively impacts the user(s) experience. This may occur even when the processing unit is underutilized.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for scheduling jobs for multiple frame-based applications are disclosed herein. In one implementation, a computing system executes a plurality of frame-based applications that generate and deliver pixels in a frame-based manner for display. The applications convey signals to a scheduler to notify the scheduler of various events within a given frame being rendered. The scheduler adjusts the priorities of applications based on the signals received from the applications. The scheduler attempts to adjust priorities of applications and schedule jobs from these applications so as to minimize the perceived latency of each application. When an application has enqueued the last job for a current frame, the scheduler raises the priority of the application to high. This results in the scheduler attempting to schedule all remaining jobs for the application back-to-back. Once all jobs of the application have been completed, the priority of the application is reduced, permitting jobs of other applications to be executed by the processing hardware. In one implementation, the processing hardware includes a plurality of compute units.

In one implementation, a frame-based application executing on the computing system generates pixels in a buffer or surface and displays or streams the buffer or surface to the end user. In this example, a buffer or surface is one frame. The frame-based application continues generating buffers or surfaces to display or stream at a fixed or variable frame rate (e.g., 60 frames per second). In various implementations, the computing system executes multiple of these frame-based applications concurrently.

Figure 1:
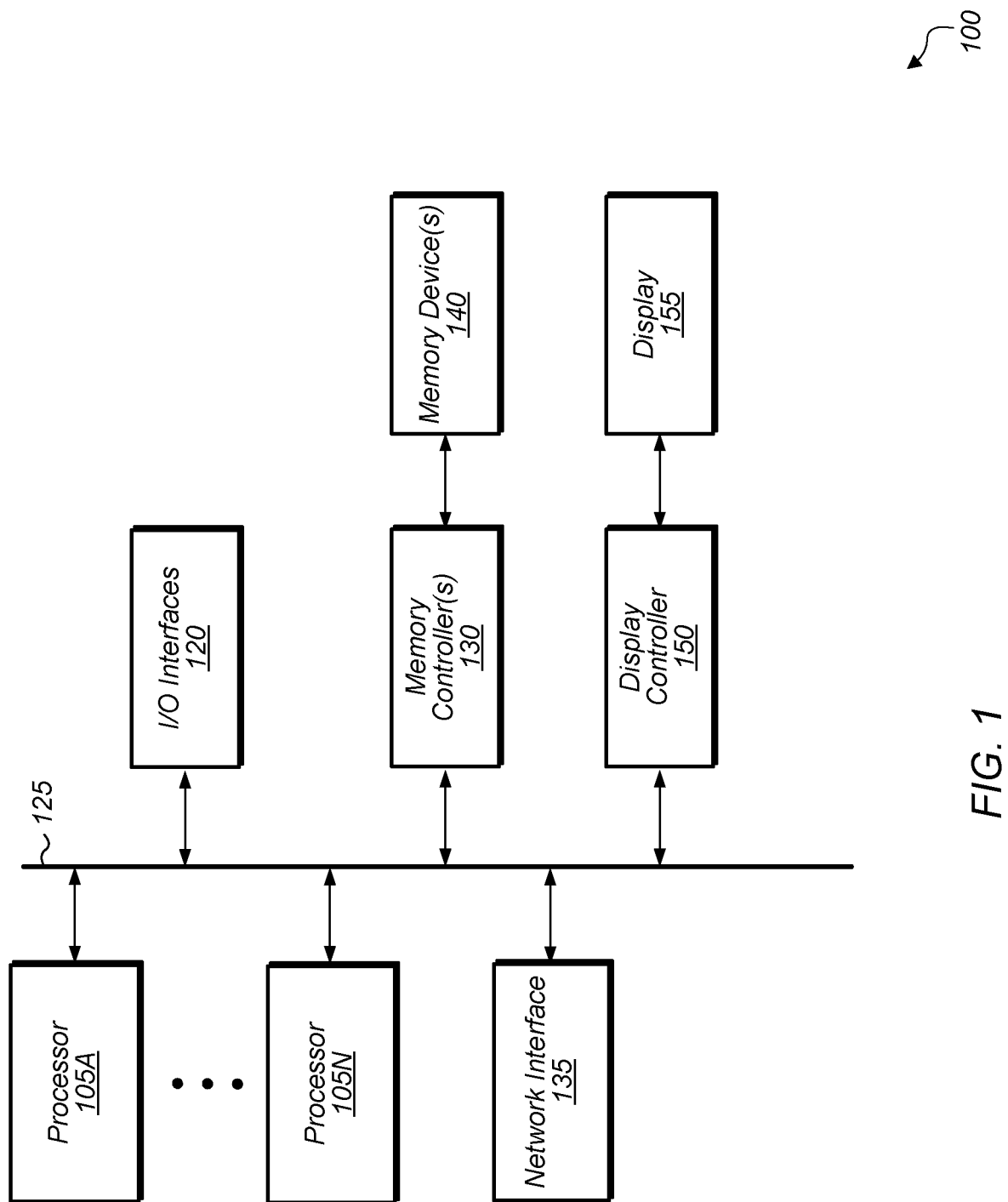
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
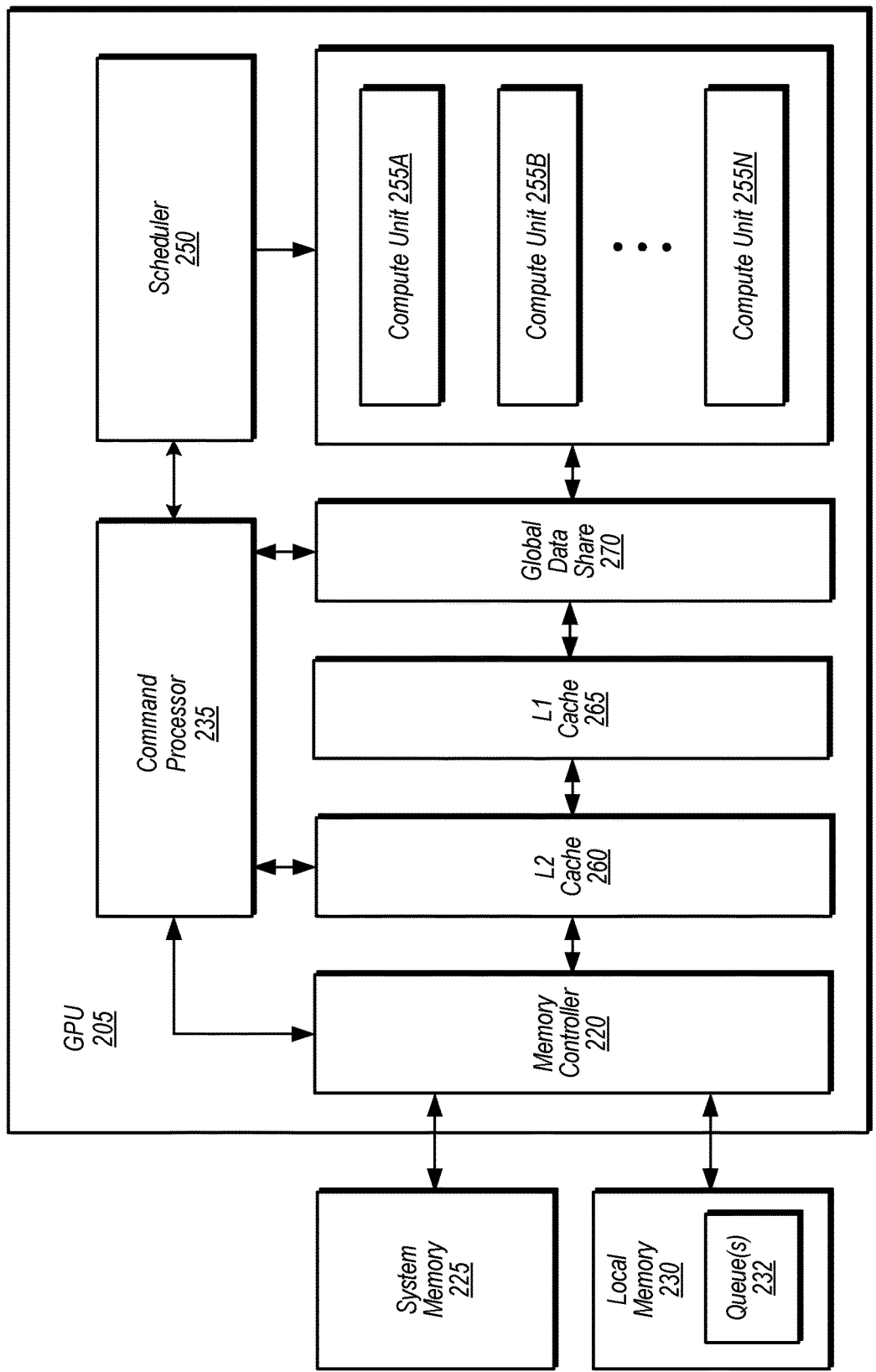
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230 which belongs to GPU 205. System 200 also includes other components which are not shown to avoid obscuring the figure. GPU 205 includes at least command processor 235, scheduler 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches commands to be performed on GPU 205. Command processor 235 receives commands from the host CPU and uses scheduler 250 to issue corresponding wavefronts (or waves for short) to compute units 255A-N. Waves executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N. In various implementations, compute units 255A-N execute any number of frame-based applications which are rendering frames to be displayed, streamed, or consumed in real-time.

In one implementation, queue(s) 232 are stored in local memory 230. In other implementations, queue(s) 232 are stored in other locations within system 200. Queue(s) 232 are representative of any number and type of queues which are allocated in system 200. In one implementation, queue(s) 232 store different types of packets. A packet is a memory buffer encoding one or more commands, and the packet can also include a pointer to executable code stored elsewhere in system 200. In one implementation, applications executing on system 200 enqueue packets corresponding to their individual jobs in queue(s) 232. When a given application has enqueued the final job for a current frame in queue(s) 232, the given application sends a signal to scheduler 250 notifying scheduler 250 of the final job being enqueued for the given application for the current frame. In response, scheduler 250 assigns a high priority to the given application and attempts to schedule jobs for the given application on compute units 255A-N so as to minimize the latency for the given application.

Figure 3:
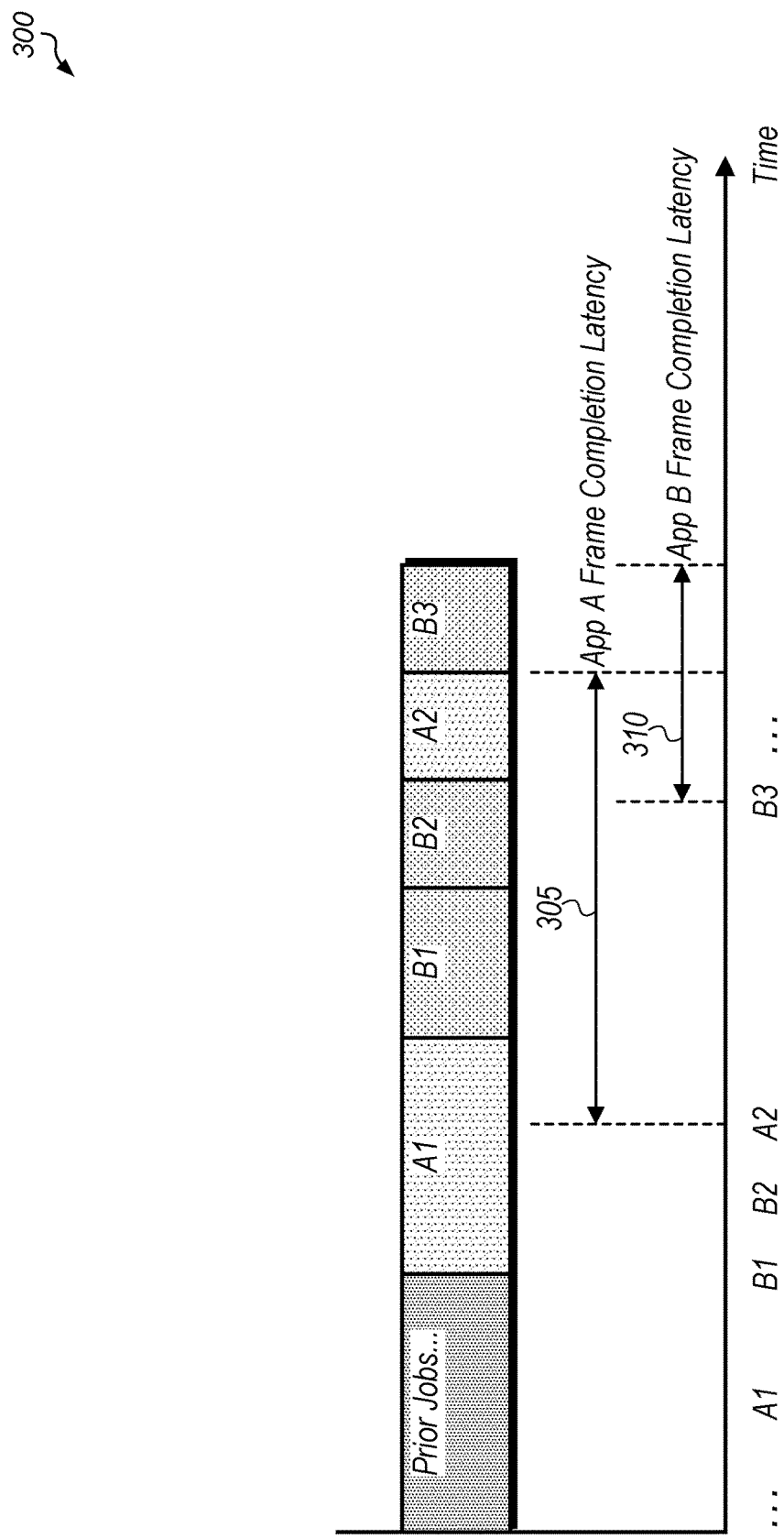
FIG. 3 is a timing diagram of one implementation of application jobs being queued and executed by a processing unit.

Referring now to FIG. 3, a timing diagram 300 of one implementation of application jobs being queued and executed by a processing unit is shown. In one implementation, frame-based real-time applications are executed on a processing unit (e.g., GPU, FPGA, ASIC, DSP). The frame-based real-time applications include any type of gaming applications as well as any type of rendering applications that submit multiple jobs per frame and repeat this process at a constant or variable frame rate. The per-frame processing unit workload (e.g., number of jobs, time per job, resources per job) can vary in complexity and computational demand depending on the application runtime behavior (e.g., complex vs. simple game scene). For such applications, the processing unit either completes frame execution sufficiently early to allow timely use of the frame (e.g., display or transmission), or the processing unit is late in completing frame execution, which results in the frame being dropped or consumed late. Such delays negatively impact the user experience. This problem often occurs with existing scheduling solutions.

An example environment exhibiting the problem is a computing system executing multiple real-time rendering applications on the same processing unit. For example, in one implementation, the computing system executes a mix of frame-based applications. The default scheduling scheme is first-come, first-serve (FCFS) based on the order in which jobs are submitted to the processing unit. Diagram 300 illustrates an example with two applications (A and B) each submitting jobs for a single frame, with the jobs of application A labeled A1 and A2, and the jobs of application B labeled B1, B2, and B3. The corresponding job labels on the X-axis (i.e., the time axis) show when each job is queued by the application. The boxes represent job execution on the processing unit, and the schedule follows a standard FCFS scheme.

The frame completion latency that is perceived by the application is labeled in FIG. 3. For each application, the latency is what is perceived by the application for the processing unit to complete its frame, measured from the time the last job was queued until this last job completes execution. Latency 305 indicates the frame completion latency for application A, and this latency extends from when job A2 is queued by the application until job A2 finishes executing on the processing unit. Similarly, latency 310 indicates the frame completion latency for application B, and this latency extends from when job B3 is queued by the application until job B3 finishes executing on the processing unit. The schedule shown in FIG. 3 is sub-optimal since completing all jobs for application A first before executing any jobs for application B would have completed application A's jobs earlier, without impacting the perceived completion latency for application B.

Figure 4:
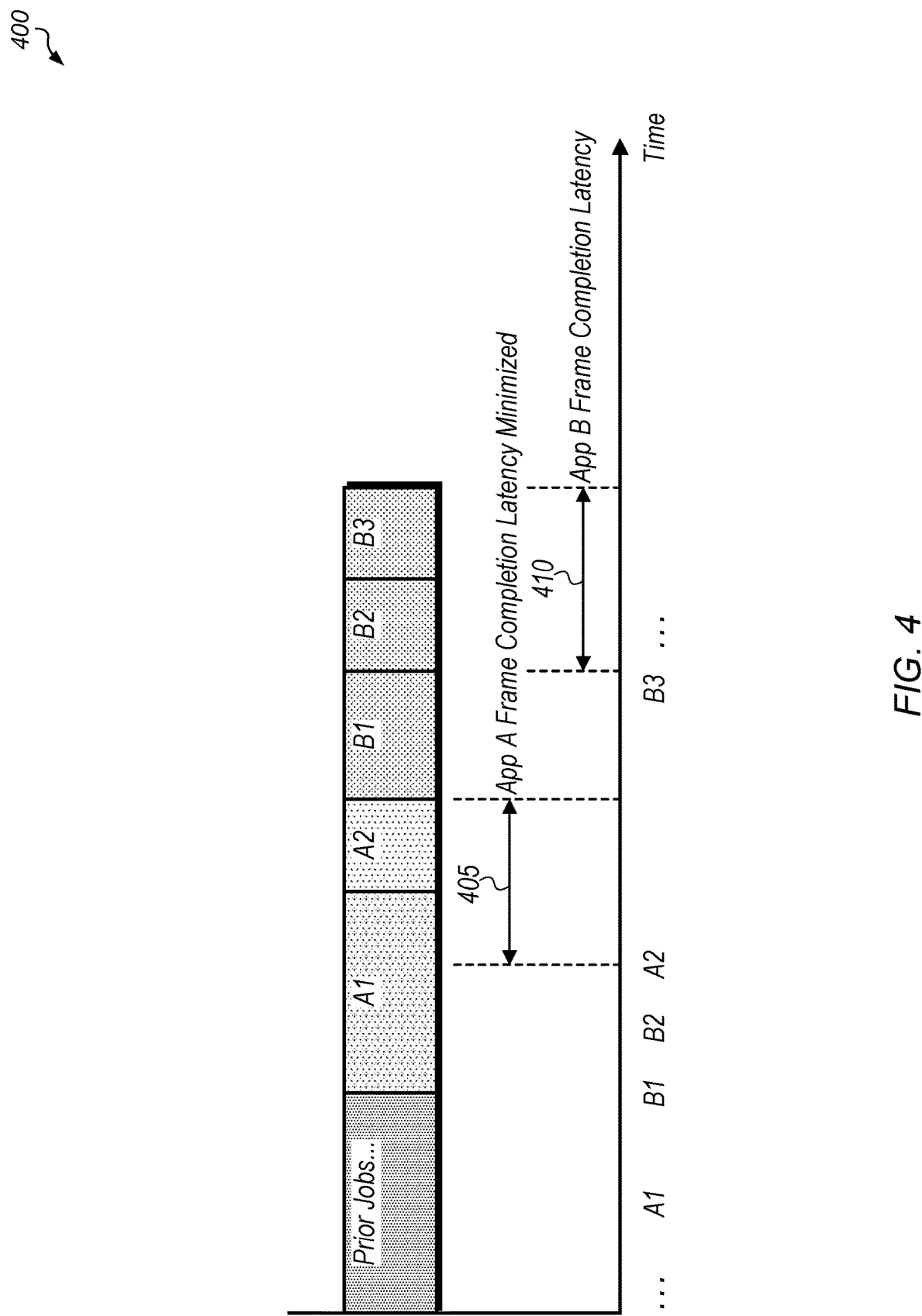
FIG. 4 is a timing diagram of one implementation of an optimized schedule for scheduling jobs for execution on a processing unit.

Turning now to FIG. 4, a timing diagram 400 of one implementation of an optimized schedule for scheduling jobs for execution on a processing unit is shown. Timing diagram 400 illustrates an alternate, optimized schedule for scheduling jobs for applications A and B with the same chronology of jobs being queued for execution as shown in FIG. 3. In timing diagram 300 (of FIG. 3), the execution of jobs B1 and B2 follows the execution of job A1. However, in timing diagram 400, job A2 follows job A1. This allows application A to finish faster and the perceived latency 405 by application A is reduced as compared to the perceived latency 305 for application A in timing diagram 300 for the traditional scheduling approach. Then, after job A2, jobs B1, B2, and B3 are performed in that order. This keeps the perceived latency 410 by application B similar to the perceived latency 310 by application B in the traditional approach.

Figure 5:
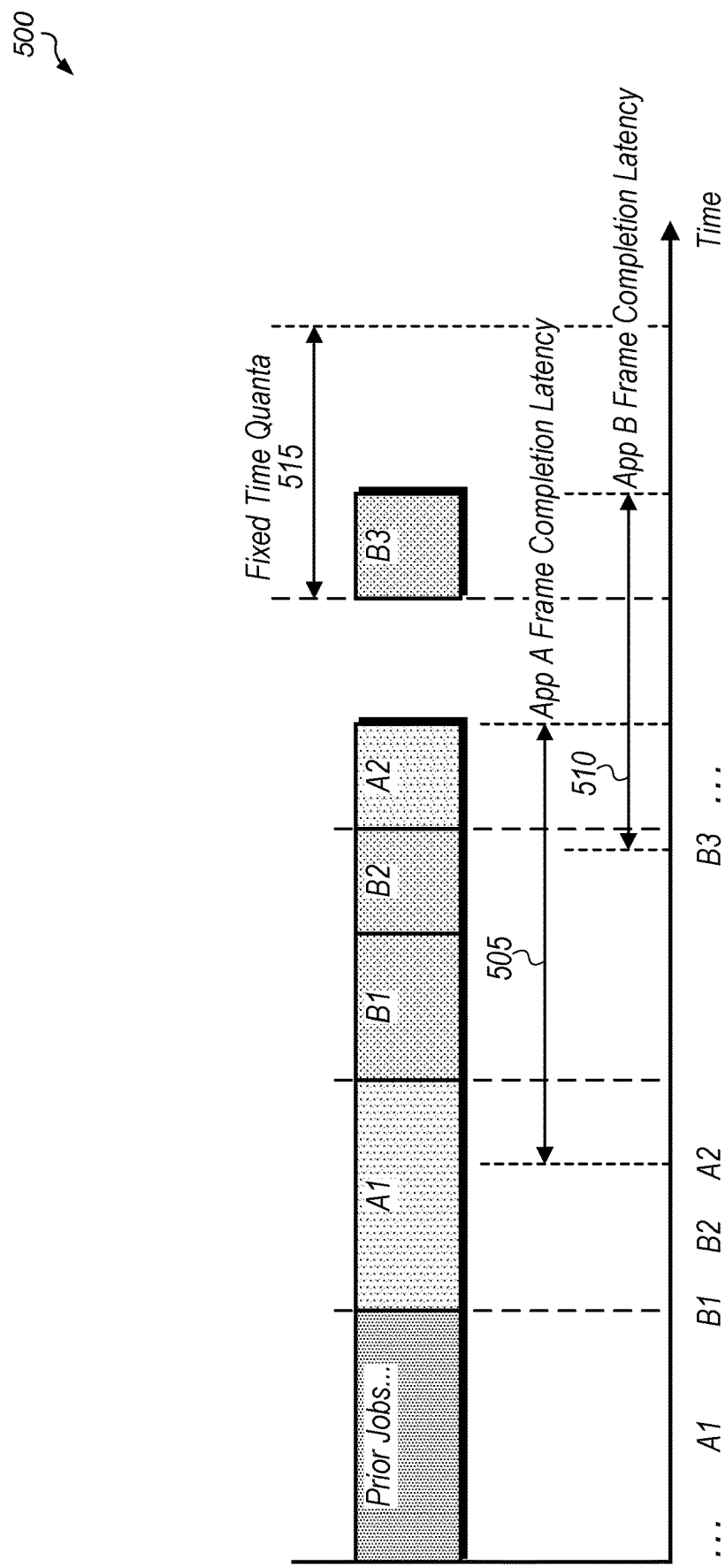
FIG. 5 is a timing diagram of one implementation of the timing of application jobs being queued and executed for a cloud gaming server.

Referring now to FIG. 5, a timing diagram 500 of one implementation of the timing of application jobs being queued and executed for a cloud gaming server is shown. In one implementation, a cloud gaming server hosts games for multiple users. In one implementation, the processing hardware (e.g., one or more GPUs) of the cloud gaming server runs multiple virtual functions (VFs) with each VF running a game for a corresponding user. In one implementation, the default scheduling scheme for the processing hardware of the cloud gaming server is round-robin time sharing, with a fixed time-quanta 515 for each VF.

Timing diagram 500 shows the execution schedule for the same example of job queuing as shown for timing diagram 300 (of FIG. 3) but with a round-robin time sharing policy instead of FCFS. As shown in timing diagram 500, application A has a perceived latency 505 while application B has a perceived latency 510. For the round-robin time sharing policy, application A is unnecessarily delayed and furthermore, due to the fixed time quanta 515, application B is also delayed even though there is idle processing hardware time in the execution schedule.

Regardless of the environment, existing scheduling schemes are not aware of the status or criticality of workloads for the different applications running on the processing hardware. This results in scheduling decisions being made without considering which application has a higher priority or urgency for frame completion. In general, even if the processing hardware is under-utilized, the applications typically experience increased frame completion latency due to a lack of knowledge in the scheduler. This lack of knowledge in the scheduler prevents the scheduler from making better scheduling decisions. In contrast, the frame-based scheduling scheme proposed herein introduces a cooperative approach to scheduling to enable a more optimal processing hardware execution schedule that reduces typical frame completion latency across all applications.

In one implementation of the cooperative approach to scheduling, job scheduling is performed based on runtime communication of each application's frame job status. As used herein, the term "frame job status" is defined as an application's current situation in regard to how many of the application's jobs for the current frame have been queued and how many of the application's jobs for the current frame have completed execution. A scheduling priority is assigned to each job, and the scheduling priority is adjusted for each application based on the application's frame job status. Application-specific knowledge of frame job status is used to communicate relevant hints to the scheduler. In one implementation, the scheduler adjusts the execution schedule of an application based on these hints to reduce the typical frame completion latency for all applications.

In one implementation, an application communicates its status to the scheduler by sending two signals to the scheduler for each frame. In this implementation, the first signal is sent after the application has just queued the final job for a particular frame. This first signal is used by the scheduler to infer that the application now has a high priority for access to the processing hardware. Since the application has just finished queueing all jobs for the frame, any further delay in executing the jobs is directly seen as increased frame completion latency by the application. If the application is provided access to the processing hardware immediately after this signal is received by the scheduler, then all remaining jobs for the frame can be executed efficiently back-to-back or in parallel (depending on inter-job dependencies and parallel execution capability) on the processing hardware to reduce execution completion latency for this frame. In one implementation, the second signal is sent just after the application has detected that execution on the processing hardware has completed for the last job of the current frame. This signal is used by the scheduler to infer that the application is now a low priority for access to the processing hardware since the application has just finished executing all jobs for the current frame.

In one implementation, when a given application becomes high priority, the given application can preempt a low priority application currently running on the processing hardware. This helps to minimize latency for high priority applications. When the given application becomes high priority, the given application can preempt another high priority application if it is the given application's turn to access the processing hardware in a high priority state. Otherwise, the other high priority application is not preempted and continues running on the processing hardware. This ensures fair alternation of high priority application execution on the processing hardware so that applications are not penalized if they always happen to become high priority after another application becomes high priority.

In one implementation, a given high priority application gets up to X milliseconds (ms) on the processing hardware, where X is a programmable value. The value of X can vary between applications and is dynamically configurable at runtime. With this approach, one goal is to give each application enough time to complete all jobs for its frame. When a particular application changes to low priority, such as for example, when the particular application completes frame execution, the particular application immediately yields the processing hardware to another application. This can occur before the X ms time quanta expires, and allows earlier execution of other applications as soon as the running application becomes low priority. In one implementation, a given low priority application gets up to Y ms on the processing hardware, where Y is a programmable value, and where Y is less than X. This ensures that all applications receive regular processing time even in a low priority state.

In one implementation, the goal of using time quantas is to prevent applications from taking too much time and starving other applications (even low priority applications) from accessing the processing hardware. The implementation and/or administrator can adjust different X and Y settings per-application statically and/or dynamically to adjust the percentage of ownership of processing hardware per-application as a reflection of the desired priority of applications. For example, in one implementation, foreground applications on the desktop receive a larger percentage of execution time than background applications since foreground applications are more directly visible to the user and are thus more important to process on time. In general, the sum of X settings for all applications should not exceed 100% of processing hardware time per frame otherwise the processing hardware is incapable of sustaining use cases for all applications simultaneously. However even if the sum of all X settings exceeds 100% of the processing hardware time per frame, the relative sizing of X for different applications will result in giving applications with a higher X setting more processing hardware time when needed.

In other implementations, an application sends other numbers and/or types of signals or hints to the scheduler for each frame. Additionally, in other implementations, more than two different priority levels can be employed. For example, in one implementation, an application sends a signal to the scheduler when the application starts to queue jobs for a frame. This signal can be used in addition to the other two previously described signals. When the scheduler receives the signal indicating that the application has started to queue jobs for a current frame, the scheduler transitions the application to a medium priority state. In this implementation, an application can be at one of three different priority levels (high, medium, or low). In another implementation, a frame deadline is tagged to the high priority signal so that the scheduler has more information about the urgency of each frame for the different applications. Attaching the frame deadline to the high priority signal allows the scheduler to make a better priority comparison between the different applications executing on the processing hardware. In other implementations, other types of signals can be generated by the application and communicated to the scheduler to enable the scheduler to make better scheduling decisions. In some implementations, a driver or other component of the processing hardware sends the signals to the scheduler on behalf of the application. In these implementations, the driver or other component is made aware of the applications' frame job status based on implementation-specific knowledge that allows such inference. For example, in one implementation, when an application makes a present call to queue a frame for display, the driver can use this present call to send the high priority signal on behalf of this application since present is the final call performed for the frame in this implementation.

Figure 6:
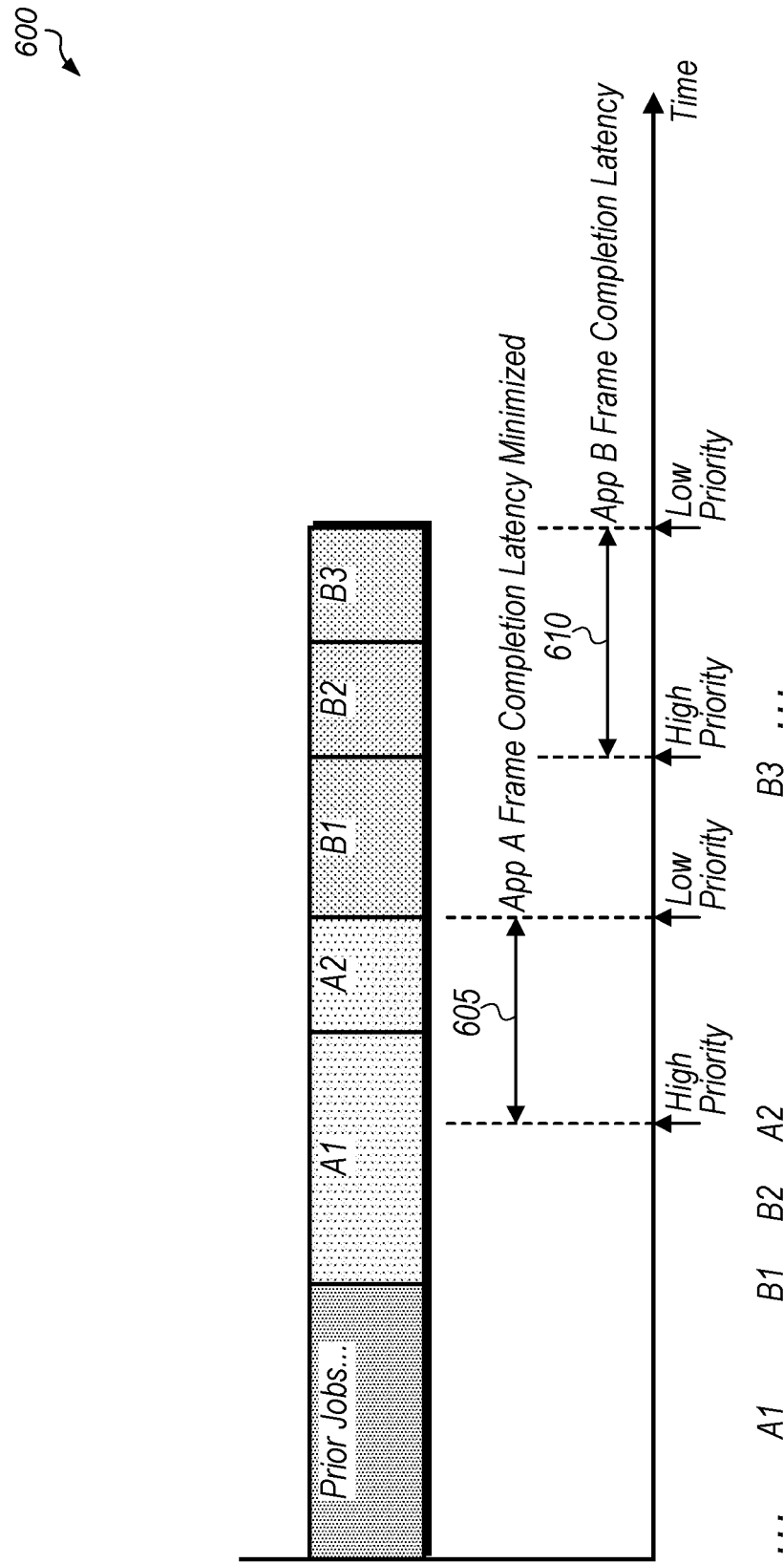
FIG. 6 is a timing diagram of one implementation of the timing of an optimized schedule for application jobs being queued and executed by processing hardware.

Turning now to FIG. 6, a timing diagram 600 of one implementation of the timing of an optimized schedule of application jobs being queued and executed by processing hardware is shown. FIG. 6 illustrates one example of an optimized schedule for the same application jobs that were shown being queued and executed in FIG. 5. In one implementation, jobs A1 and A2 of application A are performed back-to-back after application A is assigned a high priority. In one implementation, the application A sends a signal to the scheduler when the last job (i.e., A2) for the current frame is queued. The scheduler increases the priority of application A in response to receiving this signal and schedules job A2 to immediately follow job A1 on the processing hardware. This helps to minimize the frame completion latency 605 of application A.

After A2 is executed, application A sends another signal to the scheduler, with this signal indicating that the final job (i.e., A2) has now completed. In response to receiving this signal, the scheduler reduces the priority of application A. The scheduler will schedule jobs B1, B2, and B3 on the processing hardware following the completion of A2. When B3 has been queued by application B, a signal is sent to the scheduler informing the scheduler that all jobs for application B have now been queued. The scheduler will assign a high priority to application B in response to receiving this signal. When B3 has completed execution, the scheduler will assign a low priority to application B in response to receiving a signal indicating the completion of B3. The frame completion latency 610 for application B extends from the time when B3 was queued to the time when B3 has completed execution on the processing hardware. In this example, the frame completion latencies for both of application A and application B are reduced with the proposed scheduling scheme compared to FIG. 5.

Figure 7:
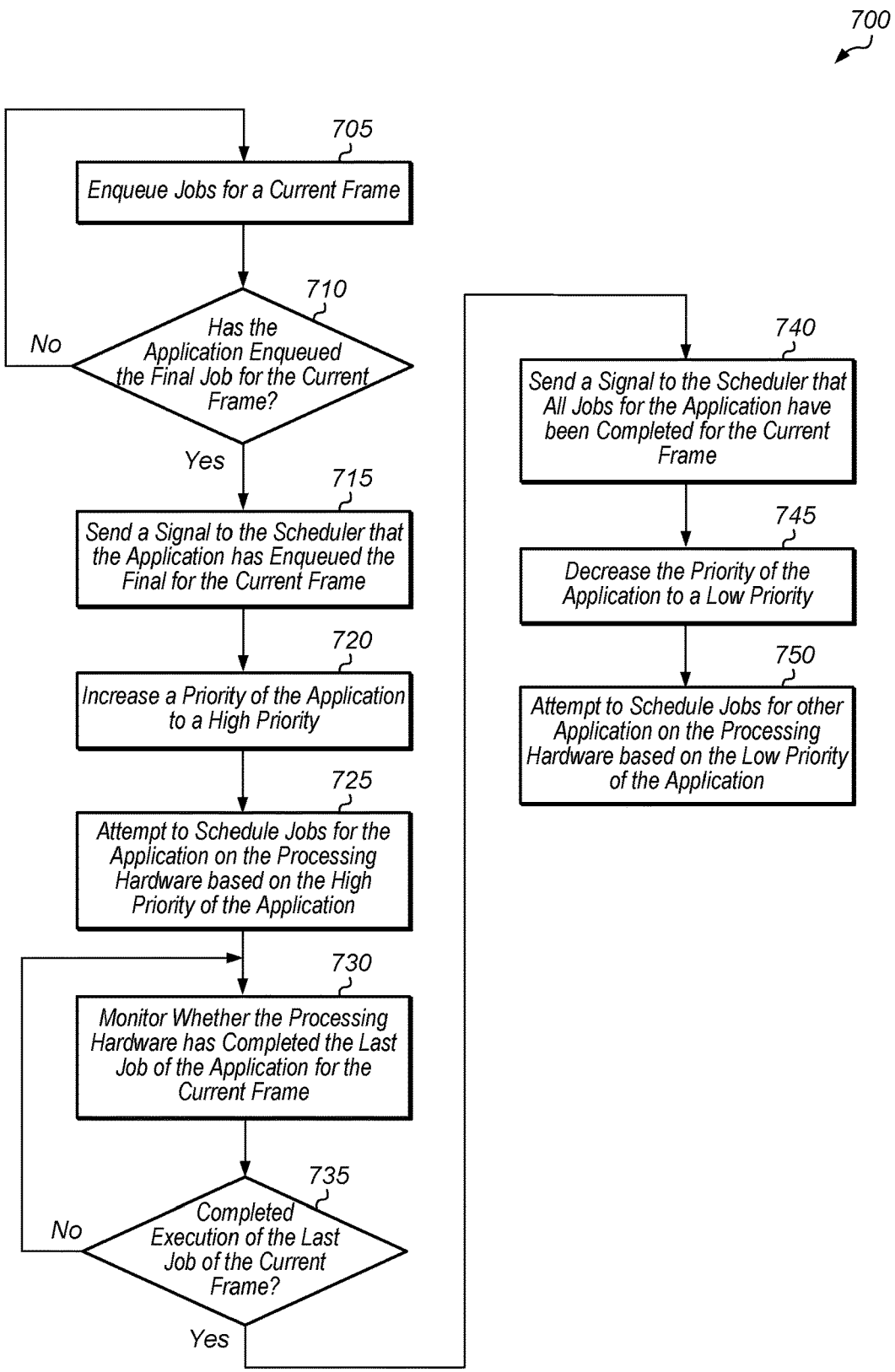
FIG. 7 is a generalized flow diagram illustrating one implementation of a method for scheduling multiple frame-based applications.
Figure 8:
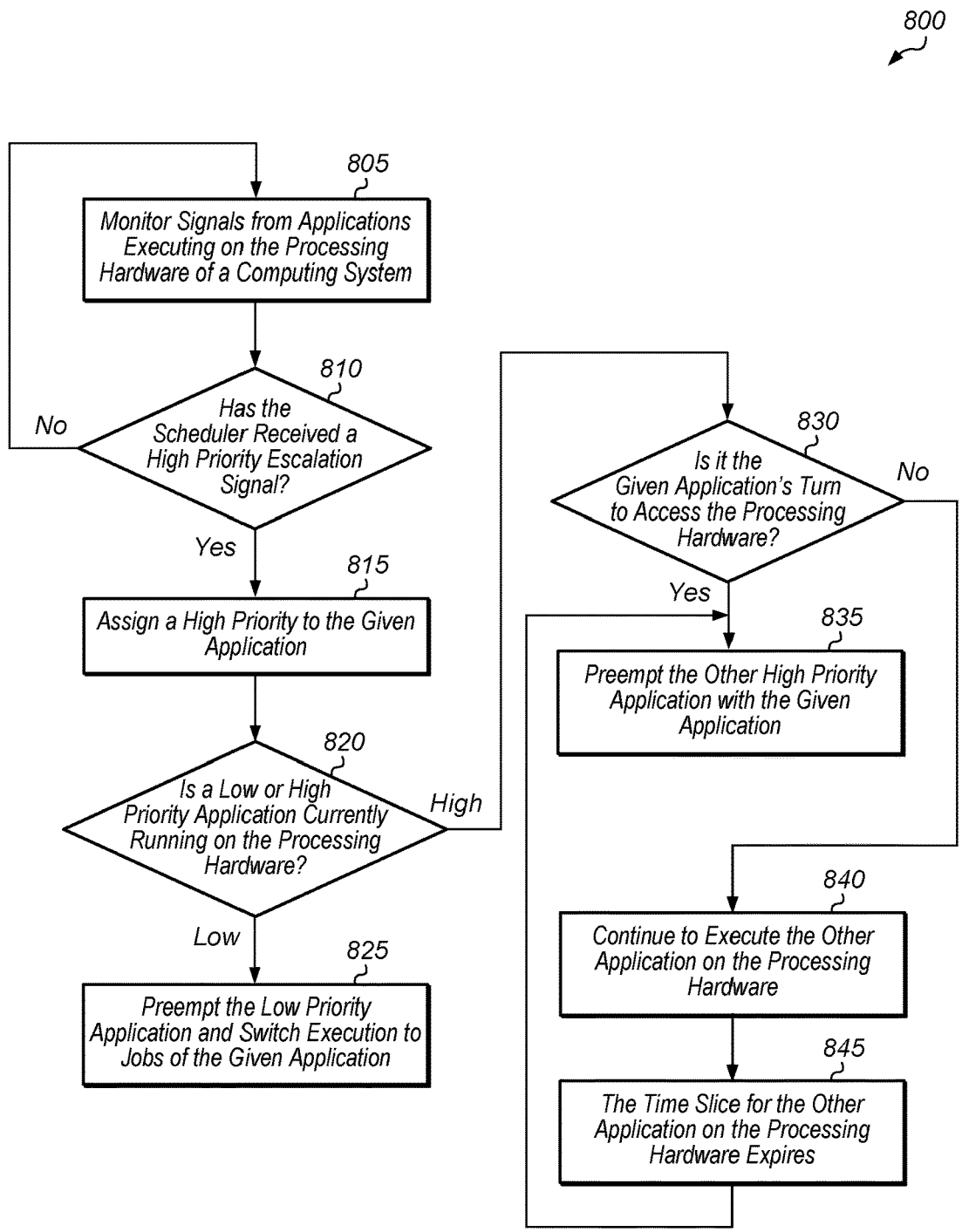
FIG. 8 is a generalized flow diagram illustrating one implementation of a method for implementing a scheduler.
Figure 9:
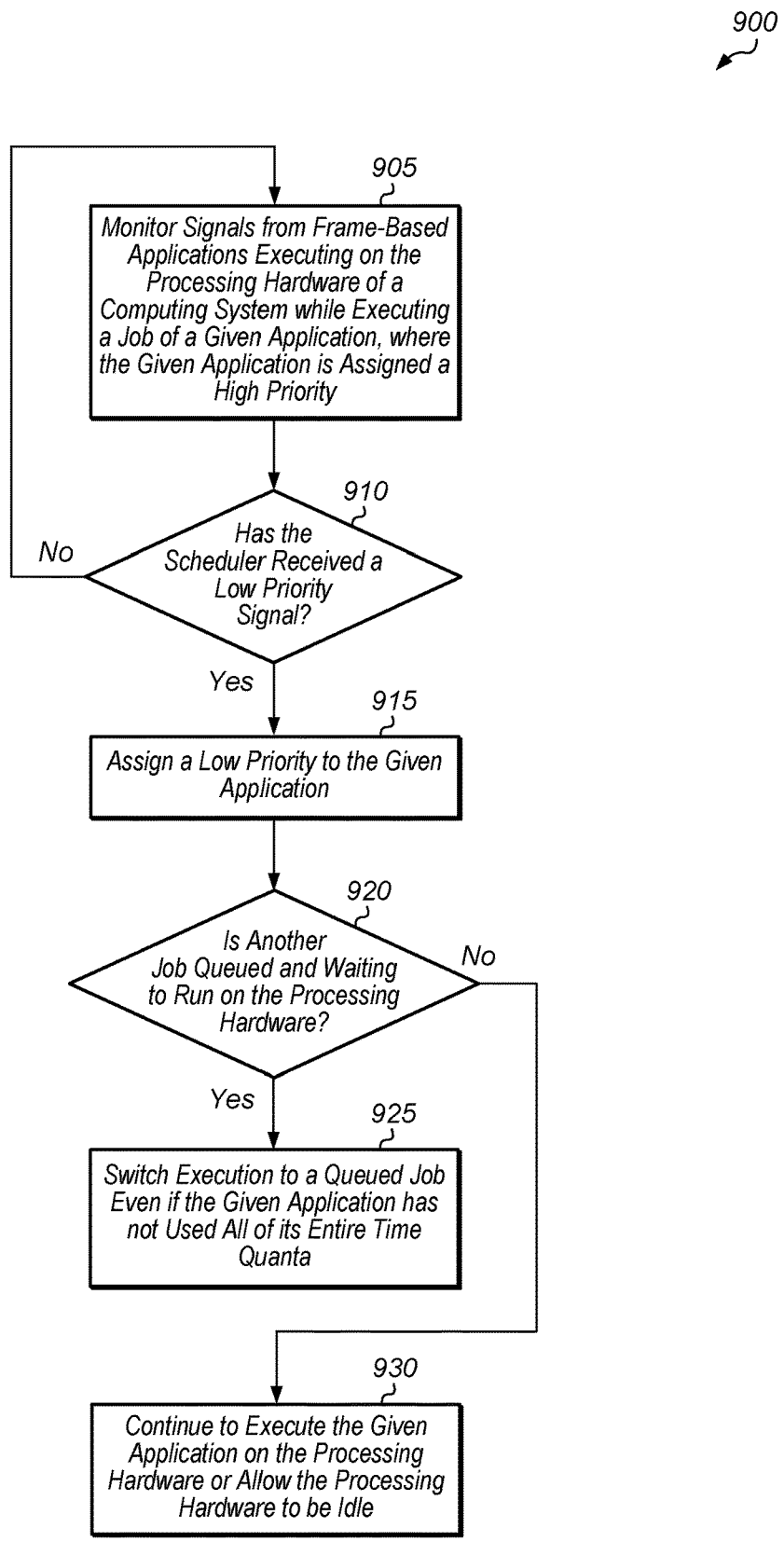
FIG. 9 is a generalized flow diagram illustrating one implementation of a method for a scheduler monitoring signals associated with frame-based applications.

Referring now to FIG. 7, one implementation of a method 700 for scheduling multiple frame-based applications is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

An application enqueues jobs for a current frame (block 705). If the application has enqueued the final job for the current frame (conditional block 710, "yes" leg), then the application sends a signal to the scheduler that the application has enqueued the final job for the current frame (block 715). If the application still has more jobs to enqueue for the current frame (conditional block 710, "no" leg), then method 700 returns to block 705 with the application continuing to enqueue jobs for the current frame.

After block 715, in response to receiving the signal from the application, the scheduler increases a priority of the application to a high priority (block 720). Then, based on the high priority of the application, the scheduler attempts to schedule jobs for the application on the processing hardware (block 725). The application monitors whether the processing hardware has completed the last job of the application for the current frame (block 730). If the application determines that the processing hardware has completed execution of the last job of the application for the current frame (conditional block 735, "yes" leg), then the application sends a signal to the scheduler notifying the scheduler that all jobs for the application have been completed for the current frame (block 740). In response to receiving the signal, the scheduler decreases the priority of the application to a low priority (block 745). Then, based on the low priority of the application, the scheduler attempts to schedule jobs on the processing hardware for other application(s) with higher priorities (block 750). After block 750, method 700 ends. If the processing hardware has not completed execution of the final job of the application (conditional block 735, "no" leg), then method 700 returns to block 730. This approach presented in method 700 results in reduced typical frame completion latency for all applications compared to the simple round-robin, FCFS or other scheduling schemes used today that are unaware of application job availability or status for each frame. The reduction of late frames means users will see a higher frames per second rate, which results in a smoother visual experience. This also reduces wasted usage of the processing hardware, which is what happens when frames are completed late and are essentially dropped or discarded without being consumed.

Turning now to FIG. 8, one implementation of a method 800 for implementing a scheduler is shown. A scheduler monitors signals from applications executing on the processing hardware of a computing system (block 805). In one implementation, the processing hardware includes one or more GPUs. In other implementations, the processing hardware includes other types of processing units. If the scheduler receives a high priority escalation signal from a given application (conditional block 810, "yes" leg), then the scheduler assigns a high priority to the given application (block 815). If the scheduler does not receive a high priority signal from any application (conditional block 810, "no" leg), then method 800 returns to block 805 and the scheduler continues to monitor for signals received from applications executing on the computing system. In one implementation, the high priority escalation signal is sent when the given application has finished queueing the final job for a current frame.

Next, after block 815, if a low priority application is currently running on the processing hardware (conditional block 820, "low" leg), then the given application that just became high priority preempts the low priority application and execution switches to jobs of the given application (block 825). Block 825 assumes that the implementation supports job preemption. If job preemption is not supported, then the currently executing application completes execution and then the switch to execute the given application's job is performed. If a high priority application is currently running on the processing hardware (conditional block 820, "high" leg), then if it is the turn of the given application to access the processing hardware in a high priority state (conditional block 830, "yes" leg), then the given application preempts the other high priority application (block 835). It is noted that for conditional block 820, if neither a low priority application nor a high priority application is currently running on the processing hardware, meaning the processing hardware is currently idle, then the given application will start executing on the processing hardware. Otherwise, if it is not the turn of the given application to access the processing hardware in a high priority state (conditional block 830, "no" leg), then the other high priority application continues to execute on the processing hardware (block 840). Next, the time slice for the other high priority application on the processing hardware expires (block 845). After block 845, method 800 jumps to block 835. After blocks 825 and 835, method 800 ends.

Referring now to FIG. 9, one implementation of a method 900 for a scheduler monitoring signals associated with frame-based applications is shown. A scheduler monitors signals from frame-based applications executing on the processing hardware of a computing system while executing a job of a given application, where the given application is assigned a high priority (block 905). In one implementation, the processing hardware includes one or more GPUs. In other implementations, the processing hardware includes other types of processing units. If the scheduler receives a low priority signal for the given application (conditional block 910, "yes" leg), then the scheduler assigns a low priority to the given application (block 915). For example, in one implementation, a low priority signal can be generated and sent to the scheduler notifying the scheduler that all jobs for the given application have been completed for the current frame. If the scheduler does not receive a low priority signal for the given application (conditional block 910, "no" leg), then method 900 returns to block 905 and the scheduler continues to monitor for signals received from applications executing on the computing system.

Next, after block 915, if another job is queued and waiting to run on the processing hardware (conditional block 920, "yes" leg), then execution switches to a queued job even if the given application has not used all of its entire time quanta (block 925). Otherwise, if no other jobs are queued and waiting to run on the processing hardware (conditional block 920, "no" leg), then the given application, now assigned a low priority, continues to execute on the processing hardware or the processing hardware is allowed to be idle (block 930). After blocks 925 and 930, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (MDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
 a data parallel processor comprising:
  a controller configured to receive jobs of a plurality of applications from a host processor;
  a scheduler configured to issue the jobs of the plurality of applications; and
  a plurality of compute units configured to execute issued jobs of the plurality of applications;
 wherein the scheduler is configured to:
  adjust a priority of a first application responsive to receiving a signal from the first application indicating a change in a frame job status for the first application, wherein the frame job status relates to a current frame being rendered by the first application; and
  determine which job of an application to schedule on the plurality of compute units based at least in part on a priority assigned to the application;
 wherein the plurality of compute units are configured to execute jobs of the plurality of applications to generate pixels to be driven to a display.
2. The system as recited in claim 1, wherein the scheduler is configured to increase a priority of the first application responsive to receiving the signal indicating that all jobs have been queued for the first application for the current frame.

3. The system as recited in claim 2, wherein the scheduler is configured to preempt execution of a second application on the plurality of compute units with the first application responsive to determining the second application is assigned a low priority.

4. The system as recited in claim 2, wherein the scheduler is configured to preempt execution of a second application on the plurality of compute units with the first application responsive to determining the second application is assigned a high priority and responsive to determining that a time quanta for executing the second application has expired.

5. The system as recited in claim 1, wherein the scheduler is configured to decrease a priority of the first application responsive to receiving the signal indicating that execution of a final job for the current frame has completed.

6. The system as recited in claim 5, wherein the scheduler is configured to preempt execution of the first application on the plurality of compute units with a second application responsive to determining that the second application is assigned a high priority.

7. The system as recited in claim 6, wherein the scheduler is configured to preempt execution of the first application on the plurality of compute units with the second application even if a time quanta for executing the first application has not expired.

8. A method comprising:
receiving, by a controller of a data parallel processor, jobs of a plurality of applications from a host processor;
issuing, by a scheduler of a data parallel processor, the jobs of the plurality of applications;
adjusting, by the scheduler, a priority of a first application responsive to receiving a signal from the first application indicating a change in a frame job status for the first application, wherein the frame job status relates to a current frame being rendered by the first application;
determining which job of an application to schedule on a plurality of compute units of the data parallel processor based at least in part on a priority assigned to the application; and
executing, in an order determined by the scheduler, jobs of a plurality of applications on the plurality of compute units to generate pixels to be driven to a display.

9. The method as recited in claim 8, further comprising increasing a priority of the first application responsive to receiving the signal indicating that all jobs have been queued for the first application for the current frame.

10. The method as recited in claim 9, further comprising preempting execution of a second application on the plurality of compute units with the first application responsive to determining the second application is assigned a low priority.

11. The method as recited in claim 9, further comprising preempting execution of a second application on the plurality of compute units with the first application responsive to determining the second application is assigned a high priority and responsive to determining that a time quanta for executing the second application has expired.

12. The method as recited in claim 8, further comprising decreasing a priority of the first application responsive to receiving the signal indicating that execution of a final job for the current frame has completed.

13. The method as recited in claim 12, further comprising preempting execution of the first application on the plurality of compute units with a second application responsive to determining that the second application is assigned a high priority.

14. The method as recited in claim 13, further comprising preempt execution of the first application on the plurality of compute units with the second application even if a time quanta for executing the first application has not expired.

15. An apparatus comprising:
a controller configured to receive jobs of a plurality of applications from a host processor;
a scheduler configured to issue the jobs of the plurality of applications; and
a memory for storing one or more queues;
wherein the scheduler is configured to:
adjust a priority of a first application responsive to receiving a signal from the first application indicating a change in a frame job status for the first application, wherein the frame job status relates to a current frame being rendered by the first application; and
determine which job, stored in the one or more queues, of an application to schedule on a plurality of compute units based at least in part on a priority assigned to the application;
wherein the apparatus is configured to execute, in an order determined by the scheduler, jobs of a plurality of applications to generate pixels to be driven to a display.

16. The apparatus as recited in claim 15, wherein the scheduler is configured to increase a priority of the first application responsive to receiving the signal indicating that all jobs have been queued for the first application for the current frame.

17. The apparatus as recited in claim 15, wherein the scheduler is configured to preempt execution of a second application on the apparatus with the first application responsive to determining the second application is assigned a low priority.

18. The apparatus as recited in claim 16, wherein the scheduler is configured to preempt execution of a second application on the plurality of compute units with the first application responsive to determining the second application is assigned a high priority and responsive to determining that a time quanta for executing the second application has expired.

19. The apparatus as recited in claim 15, wherein the scheduler is configured to decrease a priority of the first application responsive to receiving the signal indicating that execution of a final job for the current frame has completed.

20. The apparatus as recited in claim 19, wherein the scheduler is configured to preempt execution of the first application on the plurality of compute units with a second application responsive to determining that the second application is assigned a high priority.

* * * * *